(12) United States Patent
Yoshimura et al.

(10) Patent No.: US 11,939,693 B2
(45) Date of Patent: Mar. 26, 2024

(54) SURFACE-TREATED STEEL SHEET, METAL CONTAINER, AND METHOD FOR PRODUCING SURFACE-TREATED STEEL SHEET

(71) Applicant: TOYO KOHAN CO., LTD., Tokyo (JP)

(72) Inventors: Kunihiro Yoshimura, Kudamatsu (JP); Masanobu Matsubara, Kudamatsu (JP); Marie Sasaki, Kudamatsu (JP); Akihiro Yoshida, Kudamatsu (JP); Kenji Yanada, Yokohama (JP); Munemitsu Hirotsu, Yokohama (JP)

(73) Assignee: TOYO KOHAN CO., LTD., Tokyo (JP)

(*) Notice: Subject to any disclaimer, the term of this patent is extended or adjusted under 35 U.S.C. 154(b) by 0 days.

(21) Appl. No.: 17/352,059

(22) Filed: Jun. 18, 2021

(65) Prior Publication Data

US 2021/0310146 A1    Oct. 7, 2021

Related U.S. Application Data

(62) Division of application No. 15/546,624, filed as application No. PCT/JP2015/085947 on Dec. 24, 2015, now abandoned.

(30) Foreign Application Priority Data

Jan. 26, 2015   (JP) ................................ 2015-012634

(51) Int. Cl.
  *C25D 11/36*   (2006.01)
  *B32B 9/00*   (2006.01)
  (Continued)

(52) U.S. Cl.
  CPC .................. *C25D 9/12* (2013.01); *B32B 9/00* (2013.01); *B32B 15/04* (2013.01); *B32B 15/043* (2013.01);
  (Continued)

(58) Field of Classification Search
  None
  See application file for complete search history.

(56) References Cited

U.S. PATENT DOCUMENTS 3,772,165 A * 11/1973 Yamagishi ............. C25D 11/38
                                                          205/147
2004/0138058 A1   7/2004 Sambasivan et al.
(Continued)

FOREIGN PATENT DOCUMENTS

CN       1615376 A     5/2005
CN     101292061 A    10/2008
(Continued)

OTHER PUBLICATIONS

English translation JP 53006945, 1978. (Year: 1978).*
(Continued)

*Primary Examiner* — Stefanie S Wittenberg
(74) *Attorney, Agent, or Firm* — MUNCY, GEISSLER, OLDS & LOWE P.C.

(57) ABSTRACT

There is provided a surface-treated steel sheet (1) comprising: a tin-plated steel sheet (10) obtained by tin-plating a steel sheet (11); a phosphate compound layer (20) containing tin phosphate formed on the tin-plated steel sheet (10); and an aluminum-oxygen compound layer (30) on the phosphate compound layer (20), a main constituent of the aluminum-oxygen compound layer (30) being an aluminum-oxygen compound; wherein, when the $3d_{5/2}$ spectrum of tin in the aluminum-oxygen compound layer (30) is determined using an X-ray photoelectron spectroscopy, the ratio of the inte- (Continued)

gration value of the profile derived from tin oxide to the integration value of the profile derived from tin phosphate (tin oxide/tin phosphate) is 6.9 or more.

3 Claims, 8 Drawing Sheets

(51) Int. Cl.
| | | |
|---|---|---|
| *B32B 15/04* | (2006.01) | |
| *B32B 15/08* | (2006.01) | |
| *B32B 15/18* | (2006.01) | |
| *C25D 5/48* | (2006.01) | |
| *C25D 7/00* | (2006.01) | |
| *C25D 7/06* | (2006.01) | |
| *C25D 9/04* | (2006.01) | |
| *C25D 9/06* | (2006.01) | |
| *C25D 9/08* | (2006.01) | |
| *C25D 9/10* | (2006.01) | |
| *C25D 9/12* | (2006.01) | |
| *C25D 3/30* | (2006.01) | |
| *C25D 5/36* | (2006.01) | |

(52) U.S. Cl.
CPC .............. *B32B 15/08* (2013.01); *B32B 15/18* (2013.01); *C25D 5/48* (2013.01); *C25D 7/00* (2013.01); *C25D 7/0614* (2013.01); *C25D 9/04* (2013.01); *C25D 9/06* (2013.01); *C25D 9/08* (2013.01); *C25D 9/10* (2013.01); *C25D 11/36* (2013.01); *C25D 3/30* (2013.01); *C25D 5/36* (2013.01)

(56) References Cited

U.S. PATENT DOCUMENTS

| | | | |
|---|---|---|---|
| 2010/0025253 A1* | 2/2010 | Yoshioka | ............... C25D 11/06 205/333 |
| 2010/0310898 A1 | 12/2010 | Date | |
| 2011/0168563 A1 | 7/2011 | Suzuki et al. | |
| 2011/0180185 A1 | 7/2011 | Suzuki et al. | |
| 2013/0209829 A1 | 8/2013 | Suzuki et al. | |
| 2014/0102907 A1 | 4/2014 | Suzuki et al. | |

FOREIGN PATENT DOCUMENTS

| | | |
|---|---|---|
| CN | 102089462 A | 6/2011 |
| EP | 2256231 A1 | 12/2010 |
| EP | 2312016 A1 | 4/2011 |
| JP | S5275626 A | 6/1977 |
| JP | 5681696 A | 7/1981 |
| JP | 2001329221 A | 11/2001 |
| JP | 2006348360 A | 12/2006 |
| JP | 201018835 A | 1/2010 |
| JP | 2010-180452 A | 8/2010 |
| JP | 5365335 B2 | 12/2013 |
| WO | WO-2014132734 A1 | 9/2014 |
| WO | WO-2014132735 A1 | 9/2014 |
| WO | WO-2015001598 A1 | 1/2015 |

OTHER PUBLICATIONS

European Search Report cited counterpart application No. 20192629.2, dated Jan. 29, 2021, 9 pages.
European Search Report dated Jul. 31, 2019 in corresponding EP Application No. 15880168.8, six pages.
Office Action dated Mar. 7, 2018 in CN Application No. 201580074640.X, 9 pages.

* cited by examiner

EXAMPLE 6

SURFACE-TREATED STEEL SHEET, METAL CONTAINER, AND METHOD FOR PRODUCING SURFACE-TREATED STEEL SHEET

CROSS REFERENCE TO RELATED APPLICATIONS

This application is a Divisional of co-pending application Ser. No. 15/546,624, filed on Jul. 26, 2017, for which priority is claimed under 35 U.S.C. § 120; and this application claims priority of Application No. 2015-012634 filed in Japan on Jan. 26, 2015 under 35 U.S.C. § 119, the entire contents of all of which are hereby incorporated by reference.

TECHNICAL FIELD

The present invention relates to a surface-treated steel sheet, a metal container, and a method for producing a surface-treated steel sheet.

BACKGROUND ART

Methods for chromate-treating the surface of a base material used in the field of metal containers, domestic appliances, building materials, vehicles, aircrafts, and the like have been known. Further, non-chromic surface treatment, replacing such chromate treatment, has been developed. Patent Document 1 discloses, for example, a non-chromic surface treatment technique of forming a metal-oxygen compound film containing aluminum on a base material surface by means of cathode electrolytic treatment using an electrolytic treatment liquid containing aluminum ions.

PRIOR ART DOCUMENT

[Patent Document]
[Patent Document 1] JP 2006-348360A

SUMMARY OF INVENTION

Problems to be Solved by Invention

Unfortunately, the surface-treated steel sheet obtained by the conventional art described in the above Patent Document 1 may exhibit poorer corrosion resistance than that of a surface-treated steel sheet of which surface is chromate-treated when used in cans for food and beverages and the like.

It is an object of the present invention to provide a surface-treated steel sheet having excellent corrosion resistance.

Means for Solving Problems

The present inventors have found that the above object can be achieved by a surface-treated steel sheet obtained by forming a phosphate compound layer containing tin phosphate on a tin-plated steel sheet followed by forming an aluminum-oxygen compound layer mainly formed of an aluminum-oxygen compound on this phosphate compound layer wherein the content ratio between tin oxide and tin phosphate contained in the aluminum-oxygen compound layer is adjusted. The inventors have thus accomplished the present invention.

Specifically, according to an aspect of the present invention, there is provided a surface-treated steel sheet including: a tin-plated steel sheet obtained by tin-plating a steel sheet; a phosphate compound layer containing tin phosphate formed on the tin-plated steel sheet; and an aluminum-oxygen compound layer formed on the phosphate compound layer, a main constituent being an aluminum-oxygen compound, wherein, when the $3d_{5/2}$ spectrum of tin in the aluminum-oxygen compound layer is determined using an X-ray photoelectron spectroscopy, the ratio of the integration value of the profile derived from tin oxide to the integration value of the profile derived from tin phosphate (tin oxide/tin phosphate) is 6.9 or more.

In the surface-treated steel sheet of the present invention, the aluminum-oxygen compound layer preferably contains aluminum phosphate.

In the surface-treated steel sheet of the present invention, the total amount of phosphorus contained in each of the layers formed on the tin-plated steel sheet is preferably 0.5 to 20 $mg/m^2$.

In the surface-treated steel sheet of the present invention, the content of aluminum in the aluminum-oxygen compound layer is preferably 5 to 15 $mg/m^2$.

In the surface-treated steel sheet of the present invention, the aluminum-oxygen compound layer preferably contains substantially no fluorine.

In the surface-treated steel sheet of the present invention, the tin-plated steel sheet preferably consists of the steel sheet, a tin alloy layer formed on the steel sheet, and a tin-plating layer formed on the tin alloy layer, and a total amount of tin in the tin alloy layer and the tin-plating layer is preferably 1.0 $g/m^2$ or more.

According to another aspect of the present invention, a metal container formed of the surface-treated steel sheet is provided.

According to still another aspect of the present invention, there is provided a metal container including the surface-treated steel sheet and a coating layer formed on the aluminum-oxygen compound layer of the surface-treated steel sheet, a main constituent of the coating layer being an organic material.

According to still another embodiment of the present invention, there is provided a method for producing a surface-treated steel sheet including: a phosphate compound layer-formation step of forming a phosphate compound layer on a tin-plated steel sheet by means of cathode electrolytic treatment, wherein the tin-plated steel sheet is obtained by tin-plating a steel sheet; and an aluminum-oxygen compound layer-formation step of forming an aluminum-oxygen compound layer on the phosphate compound layer by means of electrolytic treatment using an electrolytic treatment liquid containing aluminum.

In the phosphate compound layer-formation step of the production method of the present invention, the phosphate compound layer is preferably formed on the tin-plated steel sheet by means of cathode electrolytic treatment after anode electrolytic treatment is conducted.

In the production method of the present invention, a treatment liquid having a phosphate content of 0.55 g/L or less in terms of phosphorus is preferably used as the electrolytic treatment liquid in the aluminum-oxygen compound layer-formation step.

Effect of Invention

According to the present invention, a phosphate compound layer and an aluminum-oxygen compound layer is formed on a tin-plated steel sheet while setting the ratio the ratio of the above tin oxide/tin phosphate to 6.9 or more in the aluminum-oxygen compound layer. Then, there can be provided a surface-treated steel sheet having excellent corrosion resistance due to action of tin oxide and phosphate such as tin phosphate contained in the aluminum-oxygen compound layer.

MODES FOR CARRYING OUT THE INVENTION

Embodiments of the present invention will hereinafter be described with reference to the figures.

Figure 1:
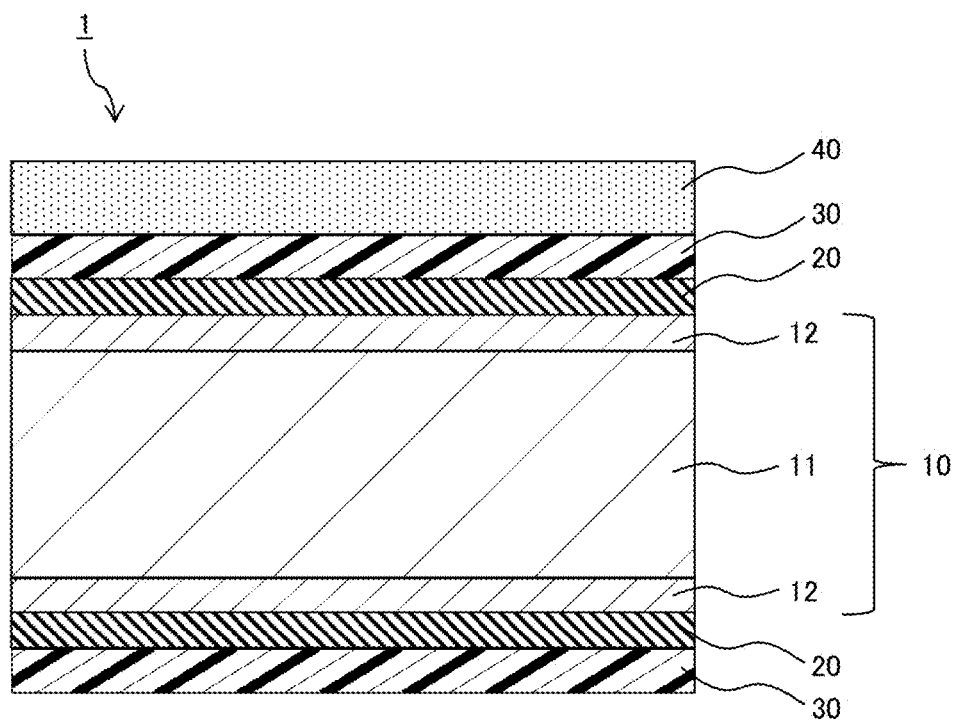
FIG. 1 is a cross-sectional view illustrating a configuration of a surface-treated steel sheet according to an embodiment of the present invention.

FIG. 1 is a cross-sectional view illustrating a configuration of a surface-treated steel sheet 1 according to an embodiment of the present invention. The surface-treated steel sheet 1 of the present embodiment is obtained by the following method: first, a tin-plated steel sheet 10 obtained by forming a tin-plating layer 12 on a steel sheet 11 is subjected to electrolytic treatment in an electrolytic treatment liquid containing phosphate ions to form a phosphate compound layer 20 on the tin-plated steel sheet 10 while dissolving a portion of the tin-plating layer 12, and subsequently the tin-plated steel sheet 10 thus subjected to electrolytic treatment is further subjected to electrolytic treatment in an electrolytic treatment liquid containing Al ions to form an aluminum-oxygen compound layer 30 on the phosphate compound layer 20 while dissolving a portion of the phosphate compound layer 20.

The surface-treated steel sheet 1 of the present embodiment may be used as, but not particularly limited to, a member such as a can container or can lid, for example. When the surface-treated steel sheet 1 is used as a member such as a can container or can lid, the surface-treated steel sheet 1 may be used as is (used in applications requiring no coating, in which no coating layer is formed on the surface) to be shaped into a non-coated can container or can lid. As shown in FIG. 1, the steel sheet 1 may also be shaped into a can container or can lid, after a coating layer 40 foamed of an organic material is formed on the aluminum-oxygen compound layer 30 of the surface-treated steel sheet 1.

<Tin-Plated Steel Sheet 10>

The tin-plated steel sheet 10, which is to be the base material of the surface-treated steel sheet 1 of the present invention, can be obtained by tin-plating the steel sheet 11 to form a tin-plating layer 12 on the steel sheet 11.

The steel sheet 11 to be tin-plated may be any steel sheet having excellent drawing formability, drawing and ironing formability, and formability in drawing and thin redrawing (DTR). For example, there can be used, but not particularly limited to, a hot-rolled steel sheet such as one based on an aluminum-killed steel continuously cast material and a cold-rolled steel sheet obtained by cold-rolling such a hot-rolled steel sheet. As for the steel sheet to be tin-plated, a steel sheet can be used whose corrosion resistance is improved by forming a nickel-plating layer on the steel sheet, heating the resulting steel sheet for thermal diffusion, and forming a nickel-iron alloy layer between the steel sheet and the nickel-plating layer. When the nickel-plating layer is formed into a granular form, the adhesion of the coating layer can be increased by an anchoring effect.

The method for tin-plating the steel sheet 11 is not particularly limited, and examples thereof include methods using a known plating bath such as a ferrostan bath, a halogen bath, and a sulfuric acid bath. The method for nickel-plating is also not particularly limited, and a known Watt bath including nickel sulfate and nickel chloride can be used. When the nickel-plating layer is formed into a granular form, a bath composition including nickel sulfate and ammonium sulfate is preferably used. Furthermore, in the present embodiment, as for the tin-plated steel sheet 10 obtained by being tin-plated, a tin-iron alloy layer may be formed between the steel sheet 11 and the tin-plating layer 12 by conducting treatment of heating the tin-plated steel sheet to a temperature equal to or higher than the melting temperature of tin followed by rapid cooling (reflow treatment). In the present embodiment, the tin-plated steel sheet 10 obtained by being subjected to this reflow treatment will be one in which the tin-iron alloy layer and the tin-plating layer 12 are formed on the steel sheet 11 in this order, resulting in improved corrosion resistance. When a nickel-plating layer is present as the base, tin-nickel and tin-nickel-iron alloys may be formed between the steel sheet 11 and the tin-plating layer 12 by this reflow treatment.

In the present embodiment, the surface of the tin-plated steel sheet 10 obtained as described above is generally oxidized by oxygen to form an oxide film layer formed of $SnO_x$ (x=1 to 3) thereon. An unduly large amount of the oxide film layer formed of $SnO_x$ tends to reduce the adhesion of the phosphate compound layer 20 formed on the tin-plated steel sheet 10. In contrast, an unduly small amount of the oxide film layer tends to easily cause sulfide blackening of the tin-plated steel sheet 10. Thus, the amount of the oxide film layer is desirably adjusted appropriately. Accordingly, in the present embodiment, treatment to adjust the amount of the oxide film layer by removing a part or all of the oxide film layer on the surface may be conducted on the tin-plated steel sheet 10. For example, treatment to remove the oxide film layer on the surface of the tin-plated steel sheet 10 may be conducted on the tin-plated steel sheet 10 by conducting at least one of cathode electrolytic treatment or anode electrolytic treatment under conditions of a current density of 0.5 to 20 $A/dm^2$ and an energizing time of 0.1 to 1.0 seconds using a carbonate alkaline solution such as sodium carbonate and sodium hydrogen carbonate. The oxide film layer may be removed also using an acidic aqueous solution such as hydrochloric acid. In this case, the immersion time of the tin-plated steel sheet 10 in an acidic aqueous solution is preferably 2 seconds or less. An immersion time of the tin-plated steel sheet 10 in an acidic aqueous solution within the above range allows efficient removal of the oxide film layer formed of $SnO_x$ while reducing dissolution of the metal tin portion of the tin-plating layer 12.

The thickness of the tin-plating layer 12 formed on the steel sheet 11 is not particularly limited. The thickness may be selected appropriately depending on the intended usage of the surface-treated steel sheet 1 to be produced, and is preferably 1.0 g/m$^2$ or more, more preferably 1.0 to 15 g/m$^2$ in terms of tin. When a nickel-plating layer is also provided, the thickness of the nickel-plating layer is not particularly limited. The thickness of the nickel-plating layer is preferably 0.01 to 15 g/m$^2$ in terms of nickel. When the nickel plating is in the granular form, the average particle size of the granular nickel is preferably 0.01 to 0.7 μm.

The total thickness of the tin-plated steel sheet 10 is not particularly limited. The thickness may be selected appropriately depending on the intended usage of the surface-treated steel sheet 1 to be produced, and is preferably 0.07 to 0.4 mm.

<Phosphate Compound Layer 20>

The phosphate compound layer 20, which is a layer containing tin phosphate, is formed by immersing the tin-plated steel sheet 10 in an electrolytic treatment liquid containing phosphate ions and conducting cathode electrolytic treatment using the tin-plated steel sheet 10 as the cathode.

Figure 2:
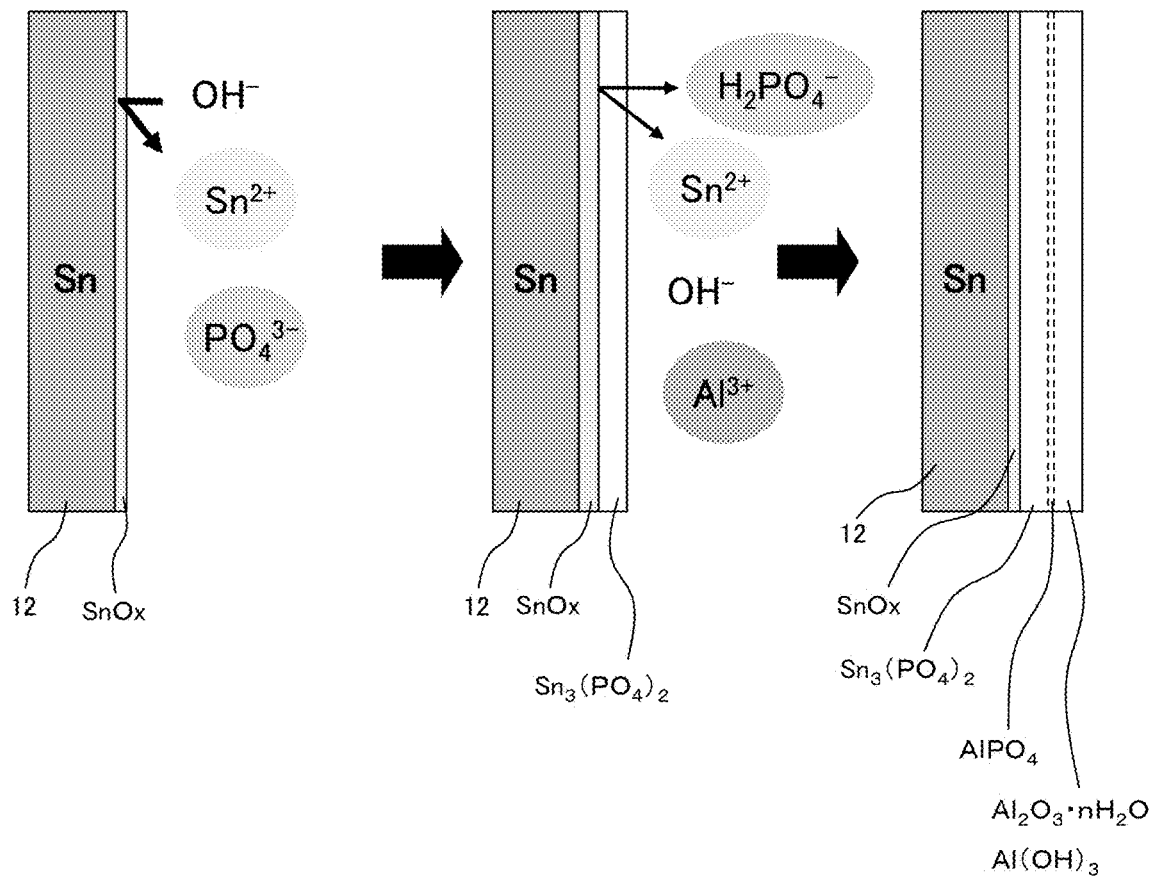
FIG. 2 is a schematic view illustrating a process of forming a phosphate compound layer and an aluminum-oxygen compound layer on a tin-plated steel sheet.

In the present embodiment, when the tin-plated steel sheet 10 immersed in an electrolytic treatment liquid containing phosphate ions is energized as the cathode side, tin dissolves from the tin-plated steel sheet 10 to generate divalent tin ions ($Sn^{2+}$) as shown in the left figure in FIG. 2.

FIG. 2 is a schematic view illustrating a process of forming a phosphate compound layer 20 and an aluminum-oxygen compound layer 30 being formed on a tin-plated steel sheet 10. The left figure in FIG. 2 illustrates a state in which the tin-plating layer 12 of the tin-plated steel sheet 10 is subjected to cathode electrolytic treatment using an electrolytic treatment liquid containing phosphate ions. The middle figure in FIG. 2 illustrates a state in which $Sn_3(PO_4)_2$ formed as the phosphate compound layer 20 is subjected to cathode electrolytic treatment for forming the aluminum-oxygen compound layer 30. The right figure in FIG. 2 illustrates a state in which $Sn_3(PO_4)_2$ and $AlPO_4$ as the phosphate compound layer 20 and $AlPO_4$, $Al_2O_3 \cdot nH_2O$, and $Al(OH)_3$ as the aluminum-oxygen compound layer 30 are formed on the tin-plated steel sheet 10. In the present embodiment, $AlPO_4$ is contained in both the phosphate compound layer 20 and the aluminum-oxygen compound layer 30.

In the present embodiment, as shown in FIG. 2, the tin ions $Sn^{2+}$ generated from the tin-plated steel sheet 10 react with phosphate ions $PO_4^{3-}$ in the electrolytic treatment liquid to be deposited on the tin-plated steel sheet 10 as tin phosphate such as $Sn_3(PO_4)_2$. The tin ions $Sn^{2+}$ generated from the tin-plated steel sheet 10 are deposited on the tin-plated steel sheet 10 also as tin oxide ($SnO_x$).

Phosphates in the aqueous solution are known to have changes in the ionization equilibrium among dihydrogen phosphate ions ($H_2PO_4^-$), hydrogen phosphate ions ($HPO_4^{2-}$), and phosphate ions ($PO_4^{3-}$) depending on the pH of the aqueous solution. As the pH of the aqueous solution becomes lower, the ionization equilibrium moves towards the side where the abundance ratio of dihydrogen phosphate ions $H_2PO_4^-$ is high. In the present embodiment, when the tin-plated steel sheet 10 is subjected to cathode electrolytic treatment with an electrolytic treatment liquid containing phosphate ions, tin oxide formed on the surface of the tin-plating layer 12 is reduced, and at the same time, hydroxide ions ($OH^-$) are generated as shown in the left figure in FIG. 2. It is presumed that this brings the pH into the range where the abundance ratio of hydrogen phosphate ions becomes higher and that these hydrogen phosphate ions react with tin ions to form tin phosphate such as $Sn_3(PO_4)_2$. The tin phosphate partly dissolves to form aluminum phosphate when the aluminum-oxygen compound layer 30 is formed by means of electrolytic treatment, as described later.

In the present embodiment, when the phosphate compound layer 20 is formed, the tin-plated steel sheet 10 may be subjected to anode electrolytic treatment using an electrolytic treatment liquid containing phosphate ions before the cathode electrolytic treatment aforementioned is conducted. The oxide film layer formed on the surface of the tin-plated steel sheet 10 is moderately removed by anode electrolytic treatment, and thereafter, the cathode electrolytic treatment allows the tin-plating layer 12 of the tin-plated steel sheet 10 to dissolve easily. This facilitates formation of the phosphate compound layer 20. This cathode electrolytic treatment is preferably conducted as follows: the tin-plated steel sheet 10 is immersed in an electrolytic treatment liquid and subjected to anode electrolytic treatment; and thereafter, while the tin-plated steel sheet 10 remains immersed in the electrolytic treatment liquid, the polarities of the anode and cathode are reversed in the energization control circuit, followed by conducting the cathode electrolytic treatment aforementioned. This facilitates control of the solution and also improves the working efficiency when anode electrolytic treatment and cathode electrolytic treatment are conducted.

In the present embodiment, when a coating layer 40 formed of an organic material is formed on the surface of the surface-treated steel sheet 1, the coating layer 40 on the surface-treated steel sheet 1 has excellent adhesion due to the formation of phosphate compound layer 20 containing tin phosphate by the cathode electrolytic treatment aforementioned. Specifically, in the case of forming the aluminum-oxygen compound layer 30 directly on the surface-treated steel sheet 1, if the coating layer 40 is formed by baking coating or the like, an oxide film layer covering the tin-plating layer 12 of the surface-treated steel sheet 1 grows due to the heat from baking, and this growth may cause the aluminum-oxygen compound layer 30 and the coating layer 40 to delaminate from this oxide film layer. In contrast, by forming the phosphate compound layer 20 aforementioned, growth of an oxide film layer covering the tin-plating layer 12 when the coating layer 40 is formed can be reduced, and as a result, the adhesion of coating layer 40 formed on the surface-treated steel sheet 1 can be increased.

In the present embodiment, by forming phosphate compound layer 20 containing tin phosphate by cathode electrolytic treatment aforementioned, the surface-treated steel sheet 1 to be obtained will have improved corrosion resistance. Specifically, the present inventors have found that the tin-plated steel sheet 10 is subjected to cathode electrolytic treatment to cause hydrogen phosphate ions to react with tin ions to thereby form tin phosphate as aforementioned and that, accordingly, the chemical bonding state and surface morphology of the tin phosphate formed by these hydrogen phosphate ions makes the tin phosphate difficult to dissolve in an electrolytic treatment liquid used when the aluminum-oxygen compound layer 30 described later is formed by means of electrolytic treatment. Accordingly, the corrosion resistance of the surface-treated steel sheet 1 to be obtained can be improved. The surface-treated steel sheet 1 to be obtained accordingly will have sufficient corrosion resistance even when the coating layer 40 mainly formed of an organic material is not formed on its surface and thus can be suitably used for a metal container including no coating layer 40 in applications requiring no coating.

In surface-treated steel sheet 1 of the present embodiment, the tin-plating layer 12 of the tin-plated steel sheet 10 partly dissolves to form the phosphate compound layer 20 and this phosphate compound layer 20 partly dissolves to form the aluminum-oxygen compound layer 30, as aforementioned. Thus, the tin-plating layer 12, the phosphate compound layer 20, and the aluminum-oxygen compound layer 30 are structured such that they are intermixed with one another near each boundary. For example, in the present embodiment, both the phosphate compound layer 20 and the aluminum-oxygen compound layer 30 may contain tin phosphate and aluminum phosphate.

Figure 6:
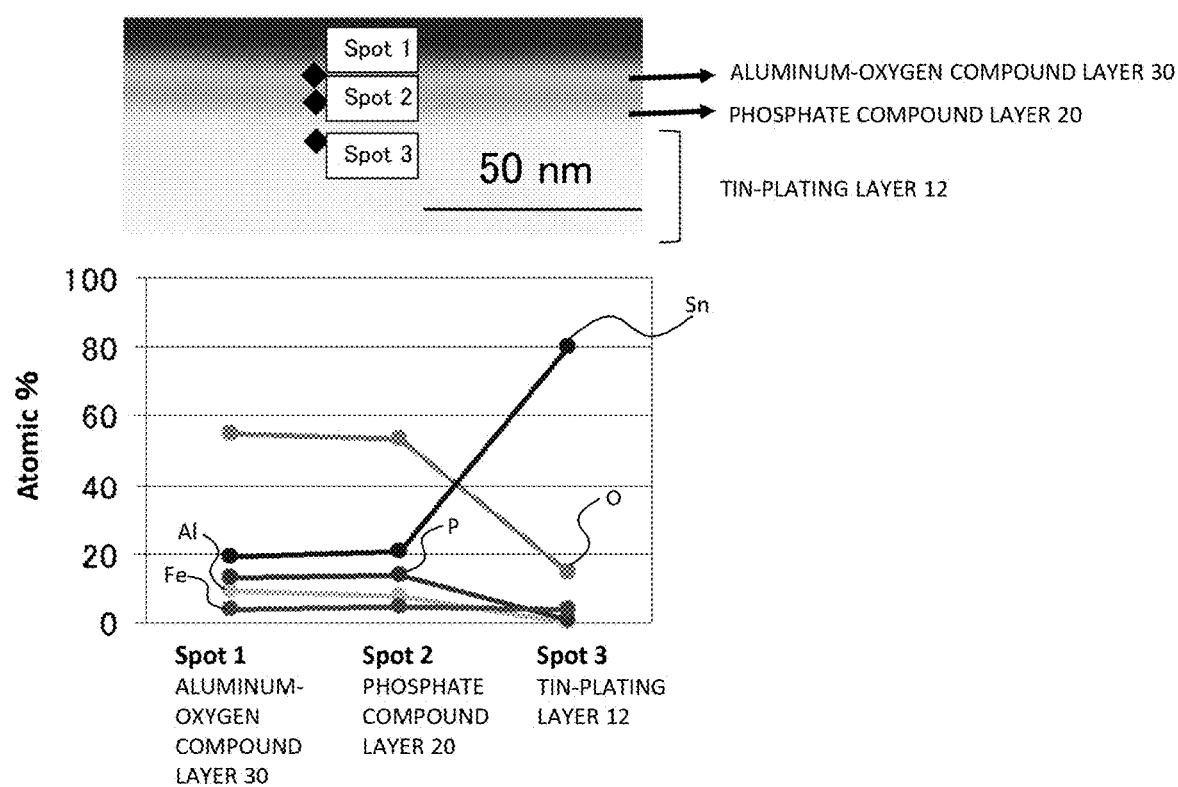
FIG. 6 includes a cross-sectional view obtained by a transmission electron microscope (TEM) illustrating a state where a phosphate compound layer and an aluminum-oxygen compound layer are formed on a tin-plated steel sheet in Example according to the present invention, and the result of quantitative analysis thereof at each point.

FIG. 6 is a cross-sectional photograph and the result of quantitative analysis by means of energy dispersive X-ray spectrometry (EDS) at each point of the phosphate compound layer 20 and the aluminum-oxygen compound layer 30 of the surface-treated steel sheet obtained in Example of the present invention. As aforementioned, it was confirmed that the boundary between the phosphate compound layer 20 and the aluminum-oxygen compound layer 30 is not obvious and that both the phosphate compound layer 20 and the aluminum-oxygen compound layer 30 may contain tin phosphate and aluminum phosphate.

As for the electrolytic treatment liquid for forming the phosphate compound layer 20, phosphoric acid ($H_3PO_4$), sodium dihydrogen phosphate ($NaH_2PO_4$), disodium hydrogen phosphate ($Na_2HPO_4$), phosphorous acid ($H_3PO_3$) or the like can be used as a compound to form phosphate ions in the electrolytic treatment liquid. These phosphoric acid and phosphates may be used singly or in admixture. Of these, a mixture of phosphoric acid and sodium dihydrogen phosphate, which enables tin phosphate to deposit satisfactorily as the phosphate compound layer 20, is suitable.

The concentration of the phosphate ions in the electrolytic treatment liquid is not particularly limited and is preferably 5 to 200 g/L in terms of phosphorus. A concentration of the phosphate ions in the electrolytic treatment liquid within the above range enables tin phosphate to deposit satisfactorily on the tin-plated steel sheet 10.

The pH of the electrolytic treatment liquid is not particularly limited and is preferably 1 to 7. With a pH of less than 1, the tin phosphate formed tends to dissolve. In contrast, with a pH of more than 7, the oxide film layer on the surface of the tin-plated steel sheet 10 insufficiently dissolves, which makes it difficult to form the phosphate compound layer 20 on a portion in which the oxide film layer is much remaining, and thus it may be impossible to form the homogeneous phosphate compound layer 20 on the tin-plated steel sheet 10.

The current density when the anode electrolytic treatment or cathode electrolytic treatment aforementioned is conducted is not particularly limited and is preferably 1 to 30 A/dm$^2$. A current density within the above range enables satisfactory formation of the phosphate compound layer 20 on the tin-plated steel sheet 10.

When the tin-plated steel sheet 10 is subjected to anode electrolytic treatment or cathode electrolytic treatment, a counter electrode plate placed opposite to the tin-plated steel sheet 10 may be any counter electrode plate that does not dissolve in the electrolytic treatment liquid while the electrolytic treatment is conducted. Because of difficulty to dissolve in the electrolytic treatment liquid, a titanium plate coated with iridium oxide or a titanium plate coated with platinum is preferable.

The energizing time when anode electrolytic treatment or cathode electrolytic treatment is conducted is not particularly limited and is preferably 0.15 to 3.0 seconds, more preferably 0.15 to 1.0 seconds. When cathode electrolytic treatment is conducted after anode electrolytic treatment as aforementioned, the energizing time of cathode electrolytic treatment is preferably is equivalent to the energizing time of anode electrolytic treatment. The number of cycles of the energizing time and stop of energization when cathode electrolytic treatment or cathode electrolysis after anode electrolytic treatment is conducted is preferably 1 to 10. The number of cycles may be adjusted together with the energizing time so as to achieve an appropriate phosphorous content in the phosphate compound layer 20. The appropriate phosphorous content in the phosphate compound layer 20 is preferably 0.5 to 20 mg/m$^2$, more preferably 0.5 to 5.0 mg/m$^2$, particularly preferably 0.7 to 4.0 mg/m$^2$.

<Aluminum-Oxygen Compound Layer 30>

In the present embodiment, the tin-plated steel sheet 10 including the phosphate compound layer 20 formed thereon is washed with water as appropriate and subsequently subjected to electrolytic treatment in an electrolytic treatment liquid containing Al ions to allow an aluminum-oxygen compound to deposit on the phosphate compound layer 20 to thereby form the aluminum-oxygen compound layer 30. The electrolytic treatment method may be either anode electrolytic treatment or cathode electrolytic treatment. Cathode electrolytic treatment is preferable, in view of capable of satisfactorily forming the aluminum-oxygen compound layer 30.

The content of the Al ion in the electrolytic treatment liquid for forming the aluminum-oxygen compound layer 30 can be appropriately selected depending on the amount of the film of the aluminum-oxygen compound layer 30 and is preferably 0.5 to 10 g/L, more preferably 1 to 5 g/L in terms of the mass concentration of the Al atom. A content of the Al ion in the electrolytic treatment liquid within the above range can improve the stability of the electrolytic treatment liquid and also improve the deposition efficiency of the aluminum-oxygen compound.

In the present embodiment, nitrate ions may be added to the electrolytic treatment liquid used for forming the aluminum-oxygen compound layer 30. When nitrate ions are added to the electrolytic treatment liquid, the content of the nitrate ion in the electrolytic treatment liquid is preferably 11,500 to 25,000 ppm by weight. A content of the nitrate ion within the above range in the electrolytic treatment liquid enables adjustment of the electrical conductivity within a suitable range.

The electrolytic treatment liquid used for forming the aluminum-oxygen compound layer 30 is preferably free of F ions. When the electrolytic treatment liquid used for forming the aluminum-oxygen compound layer 30 is free of F ions, the aluminum-oxygen compound layer 30 having a small particle size and being dense can be formed, and thus, the corrosion resistance of the surface-treated steel sheet 1 to be obtained can be improved. If F ions are contained in the electrolytic treatment liquid, they cause formation of $SnF_2$, which is then captured in the aluminum-oxygen compound layer 30 to thereby reduce the sulfide blackening resistance and corrosion resistance.

The electrolytic treatment liquid may be any electrolytic treatment liquid containing substantially no F ion, or may contain F ions in an amount of an impurity level approximately. In other words, F atoms are included at a very low level in industrial water, and thus, F ions derived from such F atoms may be included in the electrolytic treatment liquid. In this case, the F ions are present in a form of F ions forming complex ions with metal, free F ions, and the like, in the electrolytic treatment liquid. When the total amount of these F ions is preferably 50 ppm by weight or less, more preferably 20 ppm by weight or less, more preferably 5 ppm by weight or less, it can be determined that the amount of F ions contained in the electrolytic treatment liquid is approximately an impurity level, i.e., that the electrolytic treatment liquid contains substantially no F ion.

In the present invention, as for the method to measure the content of F ions and nitrate ions in the electrolytic treatment liquid, for example, a method of measurement by quantitative analysis using an ion chromatography can be used.

In addition, to the electrolytic treatment liquid for forming the aluminum-oxygen compound layer 30, at least one or more of additives selected from organic acids (citric acid, lactic acid, tartaric acid, glycolic acid and the like), polyacrylic acid, polyitaconic acid, phenol resin and the like may be added. In the present embodiment, appropriately adding one of these additives singly or two or more of these in combination to this electrolytic treatment liquid enables the aluminum-oxygen compound layer 30 to be formed to contain an organic material. This can improve the adhesion of the coating layer 40 to be formed on the aluminum-oxygen compound layer 30.

In addition, the content of the phosphate ion in the electrolytic treatment liquid for forming the aluminum-oxygen compound layer 30 is desirably adjusted. The content of phosphate ion in the electrolytic treatment liquid is preferably 0.55 g/L or less, more preferably 0.33 g/L or less, more preferably 0.11 g/L in terms of phosphorus.

Specifically, in the present embodiment, when the aluminum-oxygen compound layer 30 is formed by means of electrolytic treatment, tin phosphate and the like dissolve from the phosphate compound layer 20 into the electrolytic treatment liquid used for forming the aluminum-oxygen compound layer 30, and phosphate ions are generated. With an unduly large amount of the phosphate ions, the phosphate ions bind to Al ions to precipitate as aluminum phosphate in the electrolytic treatment liquid. This leads to decrease in the amount of Al ions in the electrolytic treatment liquid used for forming the aluminum-oxygen compound layer 30 to thereby reduce the efficiency of forming the aluminum-oxygen compound layer 30. Moreover, the aluminum-oxygen compound layer 30 to be formed by precipitation of aluminum phosphate in the electrolytic treatment liquid becomes inhomogeneous and exhibits spots, which tend to reduce the quality of appearance although without any quality problems.

In contrast, a content of phosphate ions in the electrolytic treatment liquid for forming the aluminum-oxygen compound layer 30 within the above range makes the aluminum-oxygen compound layer 30 to be formed homogeneous and improves the quality of appearance of the surface-treated steel sheet 1 to be obtained.

When the aluminum-oxygen compound layer 30 is formed by means of electrolytic treatment, an intermittent electrolysis method where a cycle of energization and stop of energization is repeated is preferably used. When the method is used, the total energization time for the base material (the total energization time when the cycle of energization and stop of energization is repeated for several times) is preferably 1.5 seconds or less, more preferably 1 second or less. The number of cycles of energization and stop of energization is preferably 1 to 10 and may be adjusted together with the energizing time so as to achieve an appropriate content of aluminum in the aluminum-oxygen compound layer 30. The appropriate content of aluminum in the aluminum-oxygen compound layer 30 is preferably 3 to 40 mg/m$^2$, more preferably 5 to 15 mg/m$^2$, particularly preferably 5.1 to 10.6 mg/m$^2$.

When the aluminum-oxygen compound layer 30 is formed, a counter electrode plate placed opposite to the base material may be any counter electrode plate that does not dissolve in the electrolytic treatment liquid while the electrolytic treatment is conducted. In view of difficulty to dissolve in the electrolytic treatment liquid due to small oxygen overvoltage, a titanium plate coated with iridium oxide or a titanium plate coated with platinum is preferable.

The aluminum-oxygen compound layer 30 formed as described above is mainly formed of aluminum oxide and the like and also contains aluminum hydroxide and phosphates. Example of the phosphate include aluminum phosphate and oxygen compounds containing phosphoric acid (such as $Al(PO_4)_yO_z$). This phosphate precipitates as the aluminum-oxygen compound layer 30 as follows. Specifically, in the present embodiment, when the tin-plated steel sheet 10 including the phosphate compound layer 20 formed thereon is subjected to electrolytic treatment with an electrolytic treatment liquid containing Al ions, as aforementioned, a portion of tin phosphate forming the phosphate compound layer 20 dissolves, and phosphate ions generated by this dissolution cause phosphates such as aluminum phosphate and oxygen compounds containing phosphoric acid to precipitate. Furthermore, in formation of the aluminum-oxygen compound layer 30, dissolution of the phosphate compound layer 20 or dissolution of a portion which is not coated the phosphate compound and thus from which tin plating is exposed leads to production of tin ions $Sn^{2+}$ in the electrolytic treatment liquid. Thus, it is presumed that, in addition to tin phosphate, tin oxide ($SnO_x$) is partly contained in the aluminum-oxygen compound layer 30. According to the present embodiment, allowing the aluminum-oxygen compound layer 30 to contain phosphate can reduce growth of the oxide film layer of the tin-plated steel sheet 10 due to the heat from baking when the coating layer 40 is formed on the aluminum-oxygen compound layer 30 by baking coating. As a result, the adhesion of the coating layer 40 to be formed on the surface-treated steel sheet 1 can be improved.

The reason why such an effect can be achieved by allowing the aluminum-oxygen compound layer 30 to contain phosphate is not necessarily obvious but can be inferred as follows. First, as described above, in the phosphate compound layer 20 obtained by means of cathode electrolytic treatment, hydrogen phosphate ions mainly react with tin ions to form tin phosphate. Accordingly, the chemical bonding state and surface morphology of the tin phosphate formed by these hydrogen phosphate ions make the aluminum-oxygen compound layer 30 difficult to dissolve in an electrolytic treatment liquid used when the aluminum-oxygen compound layer 30 is formed by means of electrolytic treatment. Then, growth of an oxide film layer of the tin-plated steel sheet 10 due to the heat from baking can be reduced. As a result, the adhesion of the coating layer 40 to be formed on the surface-treated steel sheet 1 is improved. When only tin phosphate is formed on the tin-plated steel sheet 10, the following is presumed: the tin phosphate coating film deteriorates over time; therefore, though increase in oxide film in the coating and baking steps can be reduced in the initial stage, the coating film gradually becomes fragile; and thus, the adhesion to the coating layer 40 is reduced. In the present invention, it is presumed that deterioration of tin phosphate is reduced and thus the adhesion to the coating layer 40 becomes satisfactory by providing the aluminum-oxygen compound layer 30.

Figure 3:
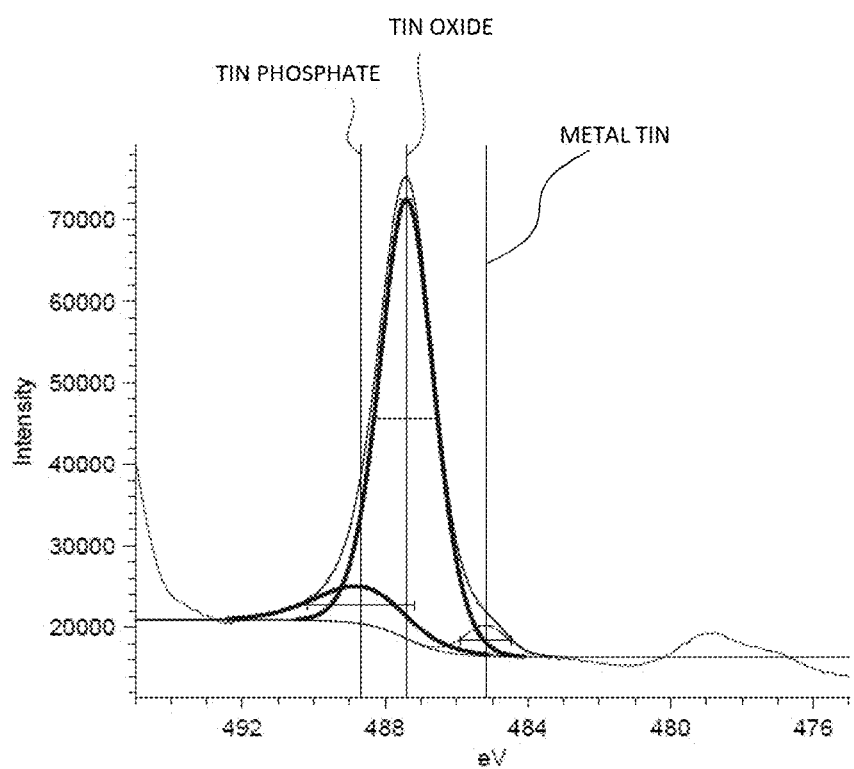
FIG. 3 is a graph showing an exemplary result of measurement of an aluminum-oxygen compound layer by an X-ray photoelectron spectroscopy (XPS).

In the aluminum-oxygen compound layer 30, when the $3d_{5/2}$ spectrum of tin in the aluminum-oxygen compound layer is determined using an X-ray photoelectron spectroscopy, the ratio of the integration value of the profile derived from tin oxide to the integration value of the profile derived from tin phosphate (a value obtained by integrating the spectrum intensity by the binding energy) (tin oxide/tin phosphate) is 6.9 or more. As shown in FIG. 3, the peak of the profile derived from tin phosphate is observed at around 489.0 eV and the peak of the profile derived from tin oxide is observed at around 487.5 eV. The peak at around 485.0 eV seems to be derived from metal tin. Tin oxide contains SnO and $SnO_2$, which were not separated. Thus, these were handled as one peak. FIG. 3 herein is a graph showing a spectrum obtained by measuring the aluminum-oxygen compound layer 30 of the surface-treated steel sheet 1 of Example 6 described later by an X-ray photoelectron spectroscopy. The vertical axis represents the spectrum intensity and the horizontal axis represents the binding energy (eV). In the present embodiment, setting the ratio of tin oxide/tin phosphate aforementioned within the above range allows the surface-treated steel sheet 1 to be obtained to have excellent corrosion resistance as well as to have excellent adhesion of the coating layer 40 to be formed on the surface.

The content of aluminum in the aluminum-oxygen compound layer 30 is preferably form 5 to 15 mg/m$^2$, more preferably 5.1 to 10.6 mg/m$^2$. An unduly low content of aluminum in the aluminum-oxygen compound layer 30 leads to increase in the oxide film layer on the surface of the tin-plated steel sheet 10 when the coating layer 40 formed of an organic material is formed by baking coating. Thus, the aluminum-oxygen compound layer 30 and the coating layer 40 tend to easily delaminate from the oxide film layer. In contrast, an unduly high content of aluminum in the aluminum-oxygen compound layer 30 may make the aluminum-oxygen compound layer 30 brittle to lead to cohesive failure.

The aluminum-oxygen compound layer 30 contain phosphate as aforementioned. The content ratio of the amount of phosphorus (mol/m$^2$) to the amount of aluminum (mol/m$^2$) in the aluminum-oxygen compound layer 30 (P/Al) is preferably 0.06 to 0.35, more preferably 0.07 to 0.27. When the above content ratio (P/Al) is less than 0.06, the oxide film layer on the surface of the tin-plated steel sheet 10 grows due to the heat from baking when the coating layer 40 formed of an organic material is formed by baking coating. Thus, the aluminum-oxygen compound layer 30 and the coating layer 40 tend to easily delaminate from the oxide film layer. In contrast, when the above content ratio (P/Al) is more than 0.35, the aluminum-oxygen compound layer 30 to be formed becomes inhomogeneous and exhibits spots, which tend to reduce the quality of appearance although without any quality problems.

The surface-treated steel sheet 1 of the present embodiment is obtained in the above manner.

In the surface-treated steel sheet 1 of the present embodiment, the total amount of phosphorus contained in each of layers to be formed on the steel sheet 11 (tin-plating layer 12, phosphate compound layer 20, and aluminum-oxygen compound layer 30) is preferably 0.5 to 10 mg/m$^2$, more preferably 0.7 to 2.5 mg/m$^2$. When the total amount of phosphorus contained in each of the layers is unduly low, the oxide film layer on the tin-plated steel sheet 10 grows due to the heat from baking when the coating layer 40 formed of an organic material is formed by baking coating. Thus, the aluminum-oxygen compound layer 30 and the coating layer 40 tend to easily delaminate from the oxide film layer. In contrast, when the total amount of phosphorus contained in each of the layer is unduly high, the content proportion of tin phosphate increases in phosphate compound layer 20, and this tin phosphate serves as an insulator. Thus, an aluminum-oxygen compound inhomogeneously precipitates during the electrolytic treatment forming the aluminum-oxygen compound layer 30, and the aluminum-oxygen compound layer 30 to be formed exhibits spots, which tend to reduce the quality of appearance although without any quality problems.

In the present embodiment, an example of the method for measuring the total amount of phosphorus contained in each of layers formed on the steel sheet 11 include a method involving quantitatively analyzing the surface-treated steel sheet 1 using an X-ray fluorescence spectrometer.

<Metal Container>

The surface-treated steel sheet 1 of the present embodiment may be used as, but not particularly limited to, a member such as a can container or can lid. When the surface-treated steel sheet 1 is used as a member such as a can container or can lid, the surface-treated steel sheet 1 may be used as is (used in applications requiring no coating, in which no coating layer 40 is formed on the surface) to be shaped into a non-coated can container or can lid. After a coating layer 40 formed of an organic material is formed on the aluminum-oxygen compound layer 30 of the surface-treated steel sheet 1, the steel sheet 1 may be shaped into a can container or can lid. The organic material forming the coating layer 40 is not particularly limited and may be selected appropriately depending on the usage of the surface-treated steel sheet 1 (for example, a usage of can containers to be filled with a specific content). Examples thereof include thermoplastic resins and thermoset resins.

As the thermoplastic resin, olefinic resin films such as polyethylene, polypropylene, ethylene-propylene copolymers, ethylene-vinyl acetate copolymers, ethylene-acryl ester copolymers, and ionomers, polyester films such as polyethylene terephthalate and polybutylene terephthalate, unstretched film or biaxially oriented films such as polyvinyl chloride films and polyvinylidene chloride films, or polyamide films such as nylon 6, nylon 6,6, nylon 11, and nylon 12 or the like can be used. Of these, unoriented polyethylene terephthalate prepared by copolymerizing with isophtalic acid is particularly preferable. Alternatively, such an organic material for forming the coating layer 40 may be used singly or may be blended with a different organic material.

As the thermoset resin, epoxy-phenol resins, polyester resins or the like can be used.

In the case of coating with a thermoplastic resin as the coating layer 40, the layer may be a single resin layer or may be a multi-layered resin layer prepared by coextrusion or the like. Using a multi-layered polyester resin layer is advantageous for the following reason: a polyester resin having a composition excellent in the adhesion property can be selected as the material of an underlying layer located at the side of the surface-treated steel sheet 1, and a polyester resin of a composition excellent in the resistance to the contents of cans, i.e., resistance to extraction and non-adsorptive property for flavor constituents, can be selected as the material for a surface layer.

Examples of the multi-layered polyester resin layer include, indicated as surface layer/lower layer, polyethylene terephthalate/polyethylene terephthalate·isophthalate, polyethylene terephthalate/polyethylene-cyclohexylene dimethylene-terephthalate, polyethylene terephthalate·isophthalate having a low isophthalate content/polyethylene terephthalate·isophthalate having a high isophthalate content, and polyethylene terephthalate·isophthalate/[blended product of polyethylene terephthalate·isophthalate and polybuthylene terephthalate·adipate], of course, without limited to limitation to the above examples. The thickness ratio of surface layer:lower layer is desirably in the range of 5:95 to 95:5.

To the above coating layer 40, compounding agents for resins known per se, for example, an antiblocking agent such as amorphous silica, an inorganic filler, various antistatic agents, a slip agent, an antioxidant (such as tocopherol), an ultraviolet absorbent and the like can be compounded in accordance with known formulations.

It is desired that the thickness of the coating layer 40 to be formed on the surface-treated steel sheet 1 obtained by the present invention be generally in the range of 3 to 50 µm, particularly of 5 to 40 µm in the case of thermoplastic resin coating. In the case of a coating layer, it is preferred that the thickness after backing be in the range of 1 to 50 µm, particularly of 3 to 30 µm. If the thickness is below the above range, the corrosion resistance will be insufficient, while if the thickness is above the above range, problems in formability may arise.

Thermal bonding of a polyester resin to the surface-treated steel sheet 1 is conducted using the quantity of heat held by the molten-resin layer and the quantity of heat held by the surface-treated steel sheet 1. The heating temperature of the surface-treated steel sheet 1 is appropriately 90° C. to 290° C. in general, particularly 100° C. to 230° C., whereas the temperature of the laminating rolls is appropriately in the range of 10° C. to 150° C.

Furthermore, the coating layer 40 to be formed on the surface-treated steel sheet 1 can be also formed by thermally bonding a polyester resin film made in advance with the T-die method or inflation film-formation method to the surface-treated steel sheet 1. As for the film, an unstretched film prepared with the cast molding method in which the extruded film is immediately cooled can also be used. Also, a biaxially-stretched film obtained by biaxially stretching this film at a stretching temperature, either subsequently or simultaneously, and thermally fixing the film after stretching can also be used.

Figure 4A:
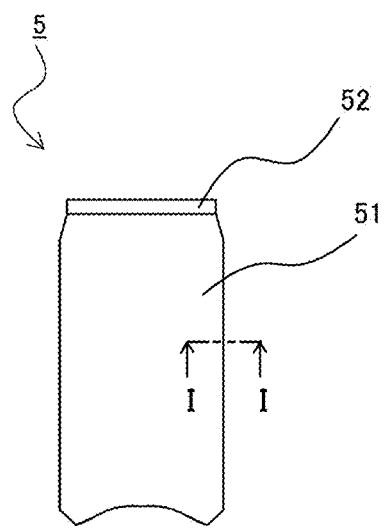
FIGS. 4(A) and 4(B) each are views illustrating an example of a metal container formed using the surface-treated steel sheet according to an embodiment of the present invention.
Figure 4B:
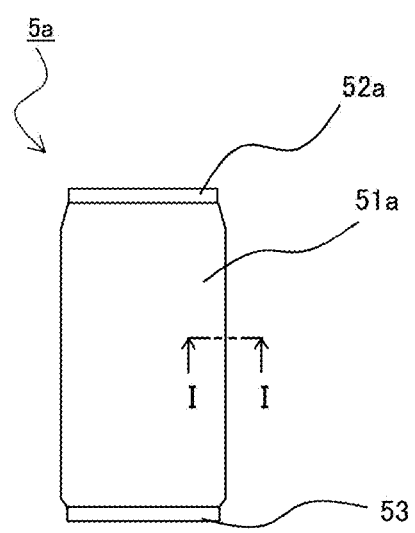

On the surface of the surface-treated steel sheet 1 of the present invention, for example, the coating layer 40 is formed to obtain an organic material-coated steel sheet, which then can be processed and shaped into a can container. Examples of the can container include, but not particularly limited to, a seamless can 5 (two-piece can) shown in FIG. 4(A) and a three-piece can 5a (welded can) shown in FIG. 4(B). A body 51 and an upper lid 52 constituting the seamless can 5 and a body 51a, an upper lid 52a, and a lower lid 53 constituting the three-piece can 5a are all formed using the organic material-coated steel sheet obtained by forming the coating layer 40 on the surface-treated steel sheet 1 of the present embodiment. In FIGS. 4(A) and 4(B), the cross-sectional views of the seamless can 5 and the three-piece can 5a are views obtained by rotating FIG. 1 above by 90° such that the coating layer 40 is located inside the can. The cans 5 and 5a respectively shown in FIGS. 4(A) and 4(B) may be produced such that the coating layer 40 is located inside the can by any conventionally known means, such as drawing process, drawing/redrawing process, stretching process via drawing/redrawing, stretching/ironing process via drawing/redrawing, or drawing/ironing process.

The seamless can 5, which is subjected to a highly sophisticated process, such as stretching process via drawing/redrawing and stretching/ironing process via drawing/redrawing, preferably has the coating layer 40 formed of thermoplastic resin coating by an extrusion coating method.

That is, the organic material-coated steel sheet, having excellent processing adhesion, has excellent coating adhesion even when subjected to severe processing, and is capable of provide a seamless can having excellent corrosion resistance.

On the surface of the surface-treated steel sheet 1 of the present invention, for example, the coating layer 40 is formed to obtain an organic material-coated steel sheet as aforementioned, which then can be processed and produced into a can lid. Examples of the can lid include, but not particularly limited to, flat lids, stay-on-tub type easy-open can lids, and pull-open type easy-open can lids.

EXAMPLES

Hereinafter, the present invention will be specifically described with reference to examples, but the present invention is not limited to these examples.

Evaluation methods of each property are as follows.
<Analysis of Electrolytic Treatment Liquid>

As for an electrolytic treatment liquid, the phosphate ion concentration or Al ion concentration was measured using an ICP emission spectrometer (manufactured by SHIMADZU CORPORATION, ICPE-9000), and the F ion concentration and nitrate ion concentration were measured with an ion chromatograph (manufactured by Dionex Corporation, DX-500). The pH of the above electrolytic treatment liquid was also measured using a pH meter (manufactured by HORIBA, Ltd.).
<Measurement of Amount of Phosphorus and Amount of Aluminum>

As for the surface-treated steel sheet 1, the amount of phosphorus and the amount of aluminum contained in each of the layers on the steel sheet 11 were measured in the unit of $mg/m^2$ using an X-ray fluorescence spectrometer (manufactured by Rigaku Corporation, ZSX100e). In addition, the content ratio of the amount of phosphorus ($mol/m^2$) to the amount of aluminum ($mol/m^2$) (P/Al) was calculated by converting the measurement values obtained into the unit of $mol/m^2$. Measurement of the amount of phosphorus and the amount of aluminum and calculation of P/Al were conducted on all the Examples and Comparative Examples described later.
<Measurement of Tin Compound in Aluminum-Oxygen Compound Layer 30>

As for the surface-treated steel sheet 1, the $3d_{5/2}$ spectrum of tin was measured using an X-ray photoelectron spectroscopy under the following conditions to thereby determine the ratio of the integration value of the profile derived from tin oxide to the integration value of the profile derived from tin phosphate (tin oxide/tin phosphate) in the aluminum-oxygen compound layer 30. Measurement of the tin compound in the aluminum-oxygen compound layer 30 and calculation of the above ratio (tin oxide/tin phosphate) were conducted only on Examples 6 described later.

The $3d_{5/2}$ spectrum of tin obtained was analyzed by waveform separation using software.
Measurement apparatus: JPS-9200 manufactured by JEOL Ltd.

Excited X-ray source: MgKα voltage 12 kV, current 25 mA

Measurement diameter: diameter 3 mm

Photoelectron take-off angle: 90° (0° with respect to the normal of the sample)

Analysis software: SpecSurf (ver. 1.7.3.9) manufactured by JEOL Ltd.

Waveform separation conditions: binding energy of tin oxide 487.5 eV, binding energy of tin phosphate 489.1 eV, and binding energy of metal tin 485.4 eV <Cross-Section Observation and Quantitative Analysis of Surface-Treated Steel Sheet>

The surface-treated steel sheet 1 was subjected to carbon vapor deposition, and then further deposited with carbon to a thickness of about 1 μm in an FIB apparatus. A sample was cut out by a microsampling method and fixed on a copper support. Thereafter, a cross-sectional TEM specimen was prepared by FIB processing and quantitatively analyzed by conducting TEM observation and EDS analysis on each point.

<FIB> FB-2000C-model focused ion beam apparatus manufactured by Hitachi, Ltd., accelerating voltage 40 kV <TEM> JEM-2010F-model field emission transmission electron microscope manufactured by JEOL Ltd., accelerating voltage 200 kV <EDS> UTW-type Si (Li) semiconductor detector manufactured by NORAN Instruments, Inc., analysis area 1 nm Cross-section observation and quantitative analysis of the surface-treated steel sheet were conducted only on Example 6 described later.

<Coating Adhesion Evaluation>

The organic material-coated steel sheet obtained by forming the coating layer 40 on the surface-treated steel sheet 1 was subjected to retort treatment at a temperature of 125° C. for 30 minutes. A grid having a spacing of 5 mm and a depth reaching the steel sheet 11 was formed on the steel sheet, and the coating layer was peeled off with tape. The degree of peeling was visually observed and evaluated based on the following criteria.

Coating adhesion evaluation was conducted on all the Examples and Comparative Examples described later.

Score 3: As a determination result of visual observation, no peeling of the coating was observed.

Score 2: As a determination result of visual observation, peeling of the coating was observed at an area ratio of ⅕ or less.

Score 1: As a determination result of visual observation, peeling of the coating was observed at an area ratio of more than ⅕.

In the coating adhesion evaluation, it was determined that, in the case where the score was 2 or more in the above criteria, the surface-treated steel sheet 1 had sufficient coating adhesion for applications of cans for food and beverages.

<Evaluation of Growth of Oxide Film Layer>

The surface-treated steel sheet 1 was thermally treated at a temperature of 205° C. for 30 minutes. The amount of the oxide film layer of tin formed on the surface of tin-plated steel sheet 10 was determined both before and after the thermal treatment. The amount of electricity required to remove the oxide film layer by electrochemical reduction was taken as the amount of the oxide film layer was determined. A 1/1000 N hydrogen bromide solution was used as the electrolytic liquid, and electrolysis was conducted under a condition of a current density of 25 μA/cm². Growth of the oxide film layer was evaluated by a value obtained by dividing the amount of the oxide film layer after the thermal treatment by the amount of the oxide film layer before the thermal treatment (oxide film layer after the thermal treatment/oxide film layer before the thermal treatment). It was considered that the oxide film layer is likely to grow by the thermal treatment as the value is larger. Evaluation of growth of the oxide film layer was carried out on all the Examples and Comparative Examples described later.

○: Oxide film layer after thermal treatment/oxide film layer before thermal treatment was 1.2 or less.

Δ: Oxide film layer after thermal treatment/oxide film layer before thermal treatment was more than 1.2 and 1.4 or less.

×: Oxide film layer after thermal treatment/oxide film layer before thermal treatment exceeded 1.4.

<Corrosion Resistance Evaluation (Model Solution)>

Test pieces were prepared by cutting the organic material-coated steel sheet obtained by forming the coating layer 40 on the surface-treated steel sheet 1 into 40-mm square pieces and protecting the cut face with 3-mm wide tape. Subsequently, a crosscut scratch having a depth reaching the steel sheet was made on the test piece prepared using a cutter. The test piece was subjected to 3 mm bulging process by an Erichsen tester (manufactured by Coating Tester Co., Ltd.) such that the intersection of the crosscut would be the apex of the bulging-processed portion. Then, the test piece bulging-processed was placed in a sealed container. After the container was filled with the following model solution and stored under an environment of 90° C. for 24 hours.

Model Solution: An Aqueous Solution Containing NaCl and Citric Acid Each Dissolved at 1.5% by Weight Thereafter, the sealed container was opened. The degree of corrosion of the test piece was visually observed and evaluated based on the following criteria. Corrosion resistance evaluation (model solution) was conducted on all the Examples and Comparative Examples described later.

Score 3: As a determination result of visual observation, the degree of corrosion was obviously lower than that of Comparative Example 2.

Score 2: As a determination result of visual observation, the degree of corrosion was equivalent to that of Comparative Example 2.

Score 1: As a determination result of visual observation, the degree of corrosion was obviously higher than that of Comparative Example 2.

In the corrosion resistance evaluation (model solution), it was determined that, in the case where the score was 2 or more in the above criteria, the surface-treated steel sheet 1 had sufficient corrosion resistance for applications of cans for food and beverages.

<Detinning Evaluation (Model Solution)>

Test pieces were prepared by cutting the surface-treated steel sheet 1 into a disc having a diameter of 49 mm and protecting the cut face with 3-mm wide tape. The amount of Sn in the test pieces prepared was measured with X-ray fluorescence. Then, the test piece was placed in a sealable container. After the container was filled with the following model solution and stored under an environment of 37° C. for 10 days.

Model Solution: An Aqueous Solution Containing 1% by Weight of Acetic Acid and 10% by Weight of Sucrose Dissolved Thereafter, the sealed container was opened. The amount of Sn in the test piece after storage under an environment of 37° C. for 10 days was measured with X-ray fluorescence, and the % of the amount of Sn remaining was calculated using the following formula.

Amount of Sn remaining (%)=(Amount of Sn before the lapse of the time−Amount of Sn after the lapse of the time)/Amount of Sn before the lapse of the time×100

When the % of the amount of Sn remaining was equivalent to or higher than that of Reference Example 1, it was determined that the surface-treated steel sheet 1 had sufficient detinning for applications of cans for food and beverages. The detinning evaluation (model solution) was conducted on Example 8, Comparative Example 3, and Reference Example 1 described later.

Example 1

First, a low carbon cold-rolled sheet (thickness: 0.225 mm) was provided as a steel sheet 11.

Subsequently, the steel sheet provided was degreased by subjecting the steel sheet to cathode electrolytic treatment using an aqueous solution of an alkaline degreasing agent (manufactured by Nippon Quaker Chemical, Ltd., Formula 618-TK2) under conditions of 60° C. and 10 seconds. After washed with tap water, the steel sheet degreased was acid pickled by immersion in an acid pickling agent (an aqueous solution of 5% by volume of sulfuric acid) at normal temperature for five seconds. Thereafter, the steel sheet was washed with tap water and subjected to tin plating using a known ferrostan bath under the following conditions to form a tin-plating layer 12 having an amount of tin of 2.8 g/m² on the surface of the steel sheet. Subsequently, the steel sheet including the tin-plating layer 12 formed was washed with water and made to generate heat by supplying a direct current thereto. The steel sheet was subjected to reflow treatment, in which the steel sheet was heated to a temperature equal to or higher than the melting temperature of tin and then rapidly cooled by sprinkling tap water thereon, to thereby prepare a tin-plated steel sheet 10.

Bath temperature: 40° C.
Current density: 10 A/dm²
Anode material: commercially available 99.999% metal tin
Total energizing time: 5 seconds (number of cycles: 5, when one cycle included energizing time of 1 second and stop time of 0.5 seconds)

Then, the tin-plated steel sheet 10 obtained was immersed in an electrolytic treatment liquid with stirring and subjected to cathode electrolytic treatment under the following conditions using an iridium oxide-coated titanium plate positioned at an interelectrode distance of 17 mm as the cathode to thereby form a phosphate compound layer 20 on the tin-plated steel sheet 10.

Electrolytic treatment liquid: an aqueous solution having a pH of 1.3 containing phosphorous acid dissolved at a concentration of 10 g/L (treatment liquid A in Table 1)
Temperature of the electrolytic treatment liquid: 40° C.
Current density: 3 A/dm²
Total energizing time: 0.5 seconds (energizing time 0.5 seconds, number of cycles 1)

The electrolytic treatment liquid used for forming the phosphate compound layer 20 was analyzed in accordance with the method aforementioned. The result is listed in Table 1. Table 1 also shows the concentration of phosphorous atoms (g/L) calculated depending on the concentration of the phosphate compound dissolved. In Example 1, the electrolytic treatment liquid shown as the treatment solution A in Table 1 was used for forming the phosphate compound layer 20. Likewise, a treatment liquid B was used in Examples 2 and 3 described later, and a treatment liquid C was used in Examples 4 to 8 and Comparative Example 1 described later. Additionally, the conditions for the electrolytic treatment when the phosphate compound layer 20 was formed on the tin-plated steel sheet 10 are shown in Table 2.

TABLE 1

Table 1

| | Phosphoric acid | Sodium dihydrogen phosphate | Disodium hydrogen phosphate | Phosphorous acid | Al ion | Nitrate ion | F ion | Phosphorus | pH |
|---|---|---|---|---|---|---|---|---|---|
| | | Amount dissolved (g/L) | | | | Concentration (g/L) | | | |
| Treatment liquid A | | | | 10 | | | | 3.2 | 1.3 |
| Treatment liquid B | 30 | 30 | | | | | | 17.2 | 1.8 |
| Treatment liquid Q | 10 | 30 | | | | | | 10.9 | 2.4 |
| Treatment liquid E | | | | | 1.5 | 15.3 | | | 3.0 |

TABLE 2

Table 2

| | Electrolytic treatment for forming phosphate compound layer | | | | | Electrolytic treatment for forming aluminum-oxygen compound layer | | | |
|---|---|---|---|---|---|---|---|---|---|
| | | Electrolysis conditions | | | | | Electrolysis conditions | | |
| | Liquid composition | Current density (A/dm²) | Number of cycles | Total energizing time of anode electrolytic treatment (sec) | Total energizing time of cathode electrolytic treatment (sec) | Liquid composition | Current density (A/dm²) | Number of cycles | Total energizing time of cathode electrolytic treatment (sec) |
| Example 1 | A | 3 | 1 | Not applicable | 0.5 | E | 4 | 1 | 0.30 |
| Example 2 | B | 3 | 1 | Not applicable | 0.5 | E | 4 | 1 | 0.30 |

TABLE 2-continued

Table 2

| | Electrolytic treatment for forming phosphate compound layer | | | | | Electrolytic treatment for forming aluminum-oxygen compound layer | | | |
|---|---|---|---|---|---|---|---|---|---|
| | | Electrolysis conditions | | | | | Electrolysis conditions | | |
| | Liquid composition | Current density (A/dm$^2$) | Number of cycles | Total energizing time of anode electrolytic treatment (sec) | Total energizing time of cathode electrolytic treatment (sec) | Liquid composition | Current density (A/dm$^2$) | Number of cycles | Total energizing time of cathode electrolytic treatment (sec) |
| Example 3 | B | 2 | 1 | Not applicable | 0.3 | E | 4 | 1 | 0.15 |
| Example 4 | C | 3 | 1 | Not applicable | 0.5 | E | 4 | 1 | 0.15 |
| Example 5 | C | 3 | 1 | Not applicable | 0.5 | E | 4 | 1 | 0.30 |
| Example 6 | C | 3 | 1 | 0.5 | 0.5 | E | 4 | 1 | 0.30 |
| Example 7 | C | 3 | 1 | 0.3 | 0.3 | E | 5 | 2 | 0.60 |
| Example 8 | C | 3 | 1 | 0.5 | 0.5 | E | 4 | 1 | 0.30 |
| Comparative Example 1 | C | 3 | 1 | Not applicable | 0.5 | — | — | — | — |
| Comparative Example 2 | — | — | — | — | — | E | 4 | 1 | 0.30 |
| Comparative Example 3 | — | — | — | — | — | E | 4 | 1 | 0.30 |

Subsequently, the tin-plated steel sheet 10 including the phosphate compound layer 20 formed thereon was washed with water. Then, the steel sheet 10 was immersed in an electrolytic treatment liquid and subjected to cathode electrolytic treatment with stirring under the following conditions using an iridium oxide-coated titanium plate positioned at an interelectrode distance of 17 mm as the anode to thereby form an aluminum-oxygen compound layer 30. Thereafter, immediate water washing with flowing water and drying provided the surface-treated steel sheet 1 in which the phosphate compound layer 20 and the aluminum-oxygen compound layer 30 were formed on the tin-plated steel sheet 10 in this order. The electrolytic treatment liquid used for forming the aluminum-oxygen compound layer 30 was analyzed in accordance with the method aforementioned. The result is listed in Table 1. In all the Examples and Comparative Examples except Comparative Example 1, the electrolytic treatment liquid shown as the treatment liquid E in Table 1 was used for forming the aluminum-oxygen compound layer 30. In addition, the conditions for the electrolytic treatment when the aluminum-oxygen compound layer 30 was formed are shown in Table 2.

Electrolytic treatment liquid: an aqueous solution having a pH of 3.0 containing aluminum nitrate dissolved as an Al compound and having an Al ion concentration of 1,500 ppm by weight, a nitrate ion concentration of 15,300 ppm by weight, and a F ion concentration of 0 ppm by weight (treatment liquid E in Table 1)

Temperature of the electrolytic treatment liquid: 40° C.

Current density: 4 A/dm$^2$

Total energizing time: 0.3 seconds (energizing time 0.3 seconds, number of cycles: 1)

The surface-treated steel sheet 1 obtained was subjected to measurement of the amount of phosphorus and the amount of aluminum in accordance with the method aforementioned. The result is listed in Table 3.

After thermal treatment at a temperature of 190° C. for 10 μminutes and the surface-treated steel sheet 1 was coated with epoxy phenolic paint such that the thickness of the coating layer after baking drying reached 70 μmg/dm$^2$ and baked at a temperature of 200° C. for 10 μminutes to thereby obtain an organic material-coated steel sheet obtained by forming a coating layer 40 on the surface-treated steel sheet 1. Subsequently, the coating adhesion evaluation, corrosion resistance evaluation (model solution), and evaluation of growth of the oxide film layer were conducted on the organic material-coated steel sheet obtained in accordance with the method aforementioned. The result is listed in Table 3.

Example 2

The surface-treated steel sheet 1 and organic material-coated steel sheet were prepared and evaluated in the same manner as in Example 1 except that an aqueous solution having a pH of 1.8 containing phosphoric acid at a concentration of 30 g/L and sodium dihydrogen phosphate at a concentration of 30 g/L each dissolved (treatment liquid B in Table 1) was used as the electrolytic treatment liquid when the phosphate compound layer 20 was formed on the tin-plated steel sheet 10. The result is listed in Table 3.

Example 3

The surface-treated steel sheet 1 and organic material-coated steel sheet were prepared and evaluated in the same manner as in Example 2 except that the energizing time of the electrolytic treatment was set to 0.3 seconds and the current density was set to 2 A/dm$^2$ when the phosphate compound layer 20 was formed and the energizing time of the electrolytic treatment was set to 0.15 seconds when the aluminum-oxygen compound layer 30 was formed.

Example 4

The surface-treated steel sheet 1 and organic material-coated steel sheet were prepared and evaluated in the same manner as in Example 1 except that an aqueous solution having a pH of 2.4 containing phosphoric acid at a concentration of 10 g/L and sodium dihydrogen phosphate at a concentration of 30 g/L each dissolved (treatment liquid C in Table 1) was used as the electrolytic treatment liquid when the phosphate compound layer 20 was formed on the tin-plated steel sheet 10 and that the energizing time of the electrolytic treatment was set to 0.15 seconds when the aluminum-oxygen compound layer 30 was formed. The result is listed in Table 3.

Example 5

Figure 5A:
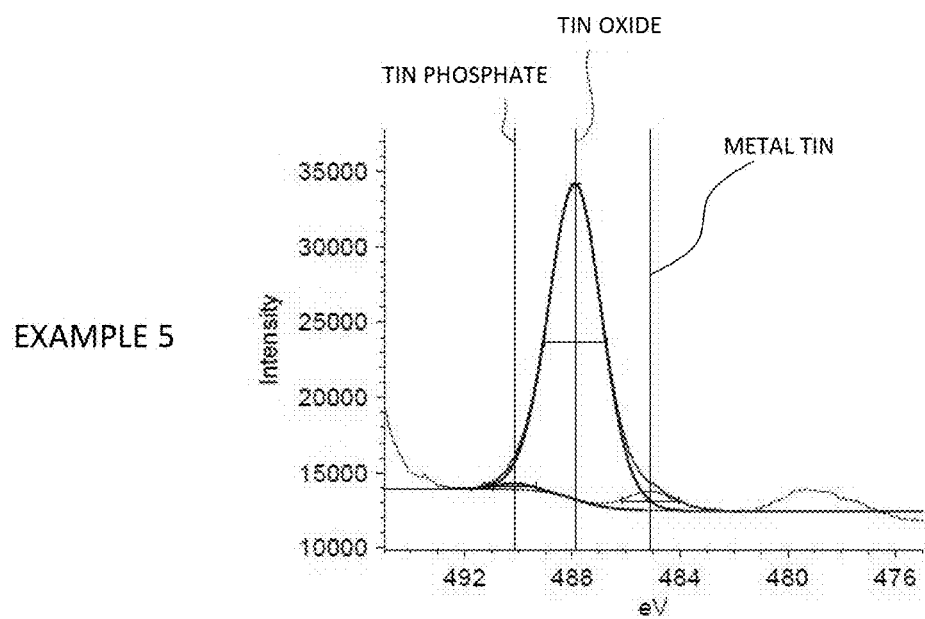
FIGS. 5(A) and 5(B) are graphs showing the result of analysis of an aluminum-oxygen compound layer by an X-ray photoelectron spectroscopy (XPS) in Example 5 and Example 6 according to the present invention, respectively.

The surface-treated steel sheet 1 and organic material-coated steel sheet were prepared and evaluated in the same manner as in Example 4 except that the treatment liquid C in Table 1 was used as the electrolytic treatment liquid when the phosphate compound layer 20 was formed on the tin-plated steel sheet 10 and the energizing time of the electrolytic treatment was set to 0.3 seconds when the aluminum-oxygen compound layer 30 was formed. The result is listed in Table 3. As for Example 5, the tin compound in the aluminum-oxygen compound layer 30 was measured, and the spectrum obtained when the tin compound in the aluminum-oxygen compound layer 30 was measured using an X-ray photoelectron spectroscopy is shown in FIG. 5(A).

Example 6

Figure 5B:
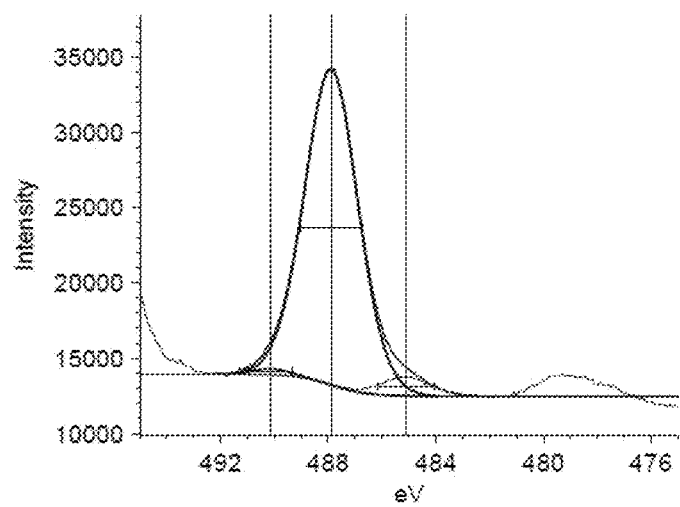

Cathode electrolytic treatment was conducted under the same conditions except that treatment in which only the polarities were reversed (anode electrolytic treatment) was conducted before the cathode electrolytic treatment aforementioned was conducted when the phosphate compound layer 20 was formed on the tin-plated steel sheet 10. Except for this, the surface-treated steel sheet 1 and organic material-coated steel sheet were prepared and evaluated in the same manner as in Example 5. The result is listed in Table 3. As for Example 6, the tin compound in the aluminum-oxygen compound layer 30 was measured, and the spectrum obtained when the tin compound in the aluminum-oxygen compound layer 30 was measured using an X-ray photoelectron spectroscopy is shown in FIG. 5(B), and the TEM image and quantitative analysis results obtained by cross-section observation of the surface-treated steel sheet are shown in FIG. 6.

Example 7

The surface-treated steel sheet 1 and organic material-coated steel sheet were prepared and evaluated in the same manner as in Example 6 except that the current density of the electrolytic treatment when the phosphate compound layer 20 was formed on the tin-plated steel sheet 10 and the current density of the electrolytic treatment, energizing time, and number of cycles when the aluminum-oxygen compound layer 30 was formed were changed as listed in Table 2. Before the phosphate compound layer 20 was formed, as pretreatment, a tin oxide film formed on the surface of the tin-plated steel sheet was removed by immersing the steel sheet in a hydrochloric acid aqueous solution. The result is listed in Table 3.

Comparative Example 1

Coating adhesion evaluation, evaluation of growth of the oxide film layer, and corrosion resistance evaluation (model solution) were conducted on the tin-plated steel sheet 10 prepared in Example 1 without forming the aluminum-oxygen compound layer 30 after the phosphate compound layer 20 had been formed. The result is listed in Table 3.

Comparative Example 2

A surface-treated steel sheet was obtained by forming the aluminum-oxygen compound layer 30 in the same manner as in Example 1 directly on the tin-plated steel sheet 10 prepared in Example 1 without forming the phosphate compound layer 20. Subsequently, the coating adhesion evaluation, evaluation of growth of the oxide film layer, and corrosion resistance evaluation (model solution) were conducted on the surface-treated steel sheet obtained. The result is listed in Table 3.

TABLE 3

| | Surface-treated steel sheet | | | | | | Properties of surface-treated steel sheet | | Growth of oxide film layer After thermal treatment/ before thermal treatment | Evaluation |
|---|---|---|---|---|---|---|---|---|---|---|
| | Amount of phosphorus (mg/m$^2$) | Amount of aluminum (mg/m$^2$) | Amount of phosphoris (mmol/m$^2$) | Amount of aluminum (mmol/m$^2$) | P/Al | Tin oxide/ phosphate | Coating adhesion | Corrosion resistance | | |
| Example 1 | 0.7 | 8.9 | 0.02 | 0.33 | 0.07 | — | 3 | 3 | 1.1 | ○ |
| Example 2 | 0.7 | 7.9 | 0.02 | 0.29 | 0.08 | — | 3 | 3 | 1.1 | ○ |
| Example 3 | 0.7 | 5.3 | 0.02 | 0.19 | 0.32 | — | 3 | 3 | 1.1 | ○ |
| Example 4 | 0.8 | 5.3 | 0.03 | 0.20 | 0.13 | — | 3 | 3 | 1.2 | ○ |
| Example 5 | 0.7 | 6.4 | 0.02 | 0.24 | 0.10 | 75.9 | 3 | 3 | 1.2 | ○ |
| Example 6 | 0.8 | 10.8 | 0.03 | 0.39 | 0.07 | 6.9 | 3 | 3 | 1.2 | ○ |
| Example 7 | 2.5 | 8.2 | 0.08 | 0.30 | 0.27 | — | 3 | 3 | 1.2 | ○ |
| Comparative Example 1 | 0.7 | — | 0.02 | | — | — | 3 | 3 | 1.8 | x |
| Comparative Example 2 | — | 9.2 | — | 0.34 | — | — | 1 | Reference | 1.4 | Δ |

<<Discussion>>

As shown in Table 3, it was confirmed that Examples 1 to 7, in which the tin-plated steel sheet 10 was subjected to cathode electrolytic treatment to form the phosphate compound layer 20 and the aluminum-oxygen compound layer 30 was formed on this phosphate compound layer 20, were satisfactory in all of the results of the coating adhesion evaluation, evaluation of growth of the oxide film layer, and corrosion resistance evaluation (model solution), had excellent corrosion resistance and adhesion of the coating layer 40, and were suitable for applications such as metal containers and the like used for a prolonged period.

In contrast, as listed in Table 3, Comparative Example 1, in which the aluminum-oxygen compound layer 30 had not been formed, had unsatisfactory results of the evaluation of growth of the oxide film layer. Accordingly, it is presumed that adhesion of the coating layer 40 may decrease due to growth of the oxide film layer. Additionally, it was confirmed that Comparative Example 2, in which the aluminum-oxygen compound layer 30 was formed directly on the tin-plated steel sheet 10 without forming the phosphate compound layer 20, had results of the coating adhesion evaluation and evaluation of growth of the oxide film layer both worse than those of Examples and had poor adhesion of the coating layer 40.

Example 8

The surface-treated steel sheet 1 was prepared in the same manner as in Example 1 except that the total energizing time was set to 7.5 seconds and the amount of tin in the tin-plating layer 12 was set to 11.2 g/m$^2$ when tin-plating layer 12 was formed and that the conditions of the electrolytic treatment for forming the phosphate compound layer and of the electrolytic treatment for forming the aluminum-oxygen compound layer were as listed in Table 2. The detinning evaluation (model solution) was conducted on the surface-treated steel sheet 1 obtained in accordance with the method aforementioned. The result is listed in Table 4.

Comparative Example 3

The surface-treated steel sheet 1 was prepared in the same manner as in Example 1 except that the total energizing time was set to 7.5 seconds and the amount of tin in the tin-plating layer 12 was set to 11.2 g/m$^2$ when tin-plating layer 12 was formed and that the conditions of the electrolytic treatment for forming the aluminum-oxygen compound layer were as listed in Table 2 without forming the phosphate compound layer 20. The detinning evaluation (model solution) was conducted on the surface-treated steel sheet obtained in the same manner as in Example 8. The result is listed in Table 4.

Reference Example 1

The tin-plated steel sheet 10 was prepared with setting the total energizing time set to 7.5 seconds and the amount of tin in the tin-plating layer 12 is formed. Thereafter, chromium hydroxide was formed by electrolytic treatment on the surface of the tin-plated steel sheet 10 to prepare a surface-treated steel sheet. The detinning evaluation (model solution) was conducted on the surface-treated steel sheet obtained in the same manner as in Example 8. The result is listed in Table 4. Reference Example 1 corresponds to a product of currently commercially available surface-treated steel sheets.

TABLE 4

Table 4

| | Surface-treated steel sheet | | | | | | Properties of surface-treated steel sheet |
|---|---|---|---|---|---|---|---|
| | Amount of phosphorus (mg/m$^2$) | Amount of aluminum (mg/m$^2$) | Amount of phosphorus (mmol/m$^2$) | Amount of aluminum (mmol/m$^2$) | P/Al | Tin oxide/tin phosphate | Detinning (amount of Sn remaining (%)) |
| Example 8 | 0.8 | 10.6 | 0.03 | 0.39 | 0.07 | 6.9 | 60 |
| Comparative Example 3 | — | 8.3 | — | 0.31 | — | — | 55 |
| Reference Example 1 | Chromate | | | | | | 50 |

<<Discussion>>

As shown in Table 4, the amount of Sn remaining of Example 8, in which the tin-plated steel sheet 10 was subjected to cathode electrolytic treatment to form the phosphate compound layer 20 and the aluminum-oxygen compound layer 30 was formed on this phosphate compound layer 20, was equivalent to or more than that of Reference Example 1, which is an existing product, and more than that of Comparative Example 3, in which the aluminum-oxygen compound layer 30 was formed directly on the tin-plated steel sheet 10 without forming the phosphate compound layer 20. Accordingly, it was confirmed that the surface-treated steel sheet 1 of Example 8, obtained by forming only the phosphate compound layer 20 and the aluminum-oxygen compound layer 30 on the tin-plated steel sheet 10, had a large amount of Sn remaining even in an uncoated state without the coating layer 40 provided, thus was excellent in corrosion resistance, and suitable for applications for metal containers and the like used uncoated.

DESCRIPTION OF REFERENCE NUMERALS

1 Surface-treated steel sheet
10 Tin-plated steel sheet
11 Steel sheet
12 Tin-plating layer
20 Phosphate compound layer
30 Aluminum-oxygen compound layer
40 Coating layer

The invention claimed is:

1. A method for producing a surface-treated steel sheet comprising:
   forming a phosphate compound layer on a tin-plated steel sheet by means of cathode electrolytic treatment, wherein the tin-plated steel sheet is obtained by tin-plating a steel sheet; and
   forming an aluminum-oxygen compound layer on the phosphate compound layer by means of electrolytic treatment using an electrolytic treatment liquid containing aluminum,
   wherein the electrolytic treatment liquid has a phosphate content of 0.11 g/L or less in terms of phosphorus atom and an aluminum ion content of 1 to 10 g/L in terms of aluminum atom,
   the electrolytic treatment for forming the aluminum-oxygen compound layer is performed by an intermittent electrolysis method where a cycle of energization and stop of energization is repeated, and a total energization time for forming the aluminum-oxygen compound layer is 1.5 seconds or less.

2. The method for producing a surface-treated steel sheet according to claim 1, wherein the phosphate compound layer is formed on the tin-plated steel sheet by means of the cathode electrolytic treatment after anode electrolytic treatment is conducted.

3. The method for producing a surface-treated steel sheet according to claim 1, wherein the phosphate compound layer is formed by immersing the tin-plated steel sheet in a treatment liquid containing phosphate ions to generate divalent tin ions from dissolved tin of the tin-plated steel sheet, and performing the cathode electrolytic treatment so that the divalent tin ions react with the phosphate ions so as to be deposited on the tin-plated steel sheet as tin phosphate.

* * * * *